(12) United States Patent
Moreno (10) Patent No.: US 10,730,488 B2
(45) Date of Patent: Aug. 4, 2020

(54) LOW-PROFILE TRAILER JACK

(71) Applicant: Refujio Moreno, Tatum, TX (US)

(72) Inventor: Refujio Moreno, Tatum, TX (US)

( * ) Notice: Subject to any disclaimer, the term of this patent is extended or adjusted under 35 U.S.C. 154(b) by 81 days.

(21) Appl. No.: 16/049,923

(22) Filed: Jul. 31, 2018

(65) Prior Publication Data

US 2020/0039478 A1 Feb. 6, 2020

(51) Int. Cl.
*B66F 3/00* (2006.01)
*B60S 9/22* (2006.01)
*B60S 9/02* (2006.01)
*B60D 1/66* (2006.01)

(52) U.S. Cl.
CPC .................. *B60S 9/22* (2013.01); *B60D 1/66* (2013.01); *B60S 9/02* (2013.01)

(58) Field of Classification Search
CPC .. B66R 3/00; B66R 5/28; B66R 5/007; B66R 7/16; B60S 9/00; B60S 9/12; B60S 9/20; B60S 9/22
See application file for complete search history.

(56) References Cited

U.S. PATENT DOCUMENTS

| | | | | |
|---|---|---|---|---|
| 3,595,527 A * | 7/1971 | Douglass | ................. | B60D 1/66 254/420 |
| 3,851,855 A * | 12/1974 | Douglass | ................. | B66F 3/08 254/420 |
| 3,870,278 A | 3/1975 | Lee | | |
| 5,174,550 A * | 12/1992 | Pittman | ..................... | B60S 9/18 254/420 |
| 5,421,555 A * | 6/1995 | Sims | ....................... | B60D 1/66 254/420 |
| 7,192,007 B2 | 3/2007 | Thomas | | |
| 7,584,677 B1 * | 9/2009 | Johnson | ................... | B60D 1/66 254/424 |
| 8,113,479 B1 | 2/2012 | O'Connell | | |
| 8,246,011 B1 * | 8/2012 | Fox, III | ................... | B60D 1/66 254/418 |
| D722,414 S | 2/2015 | Lusty | | |
| 9,308,894 B2 | 4/2016 | Lusty et al. | | |
| 9,446,743 B2 * | 9/2016 | Madison | ................... | B60S 9/22 |
| 10,000,189 B2 * | 6/2018 | Zimmerman | ............ | B60D 1/66 |
| 2010/0213427 A1 * | 8/2010 | Trowbridge | ............ | B60D 1/06 254/420 |
| 2011/0253954 A1 * | 10/2011 | Fortner | ..................... | B66F 3/10 254/98 |
| 2015/0232313 A1 * | 8/2015 | Mater, Jr. | ................ | B66F 13/00 254/420 |

* cited by examiner

Primary Examiner — Lee D Wilson (57) ABSTRACT

A low-profile trailer jack for preventing damage to a jack includes a jack module that comprises a plurality of nested sections so that the jack module is selectively extensible. A first coupler is coupled to the jack module. A second coupler is coupled to an upper face of a hitch assembly proximate to an orifice that is positioned through the hitch assembly. The second coupler is complementary to the first coupler. The jack module is configured to be inserted into the orifice, positioning the second coupler to couple to the first coupler to fixedly position the jack module within the orifice. A top of the jack module is positioned proximate to the second coupler. An actuator is operationally coupled to the jack module. The actuator is positioned to extend the nested sections so that a bottom of the jack module contacts a surface to elevate the hitch assembly.

14 Claims, 6 Drawing Sheets

LOW-PROFILE TRAILER JACK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to trailer jacks and more particularly pertains to a new trailer jack for preventing damage to a jack.

BRIEF SUMMARY OF THE INVENTION

An embodiment of the disclosure meets the needs presented above by generally comprising a jack module that comprises a plurality of nested sections so that the jack module is selectively extensible. A first coupler is coupled to the jack module. A second coupler is coupled to an upper face of a hitch assembly proximate to an orifice that is positioned through the hitch assembly. The second coupler is complementary to the first coupler. The jack module is configured to be inserted into the orifice, positioning the second coupler to couple to the first coupler to fixedly position the jack module within the orifice. A top of the jack module is positioned proximate to the second coupler. An actuator is operationally coupled to the jack module. The actuator is positioned to extend the nested sections so that a bottom of the jack module contacts a surface to elevate the hitch assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new trailer jack embodying the principles and concepts of an embodiment of the disclosure and generally designated by the reference numeral 10 will be described.

Figure 1:
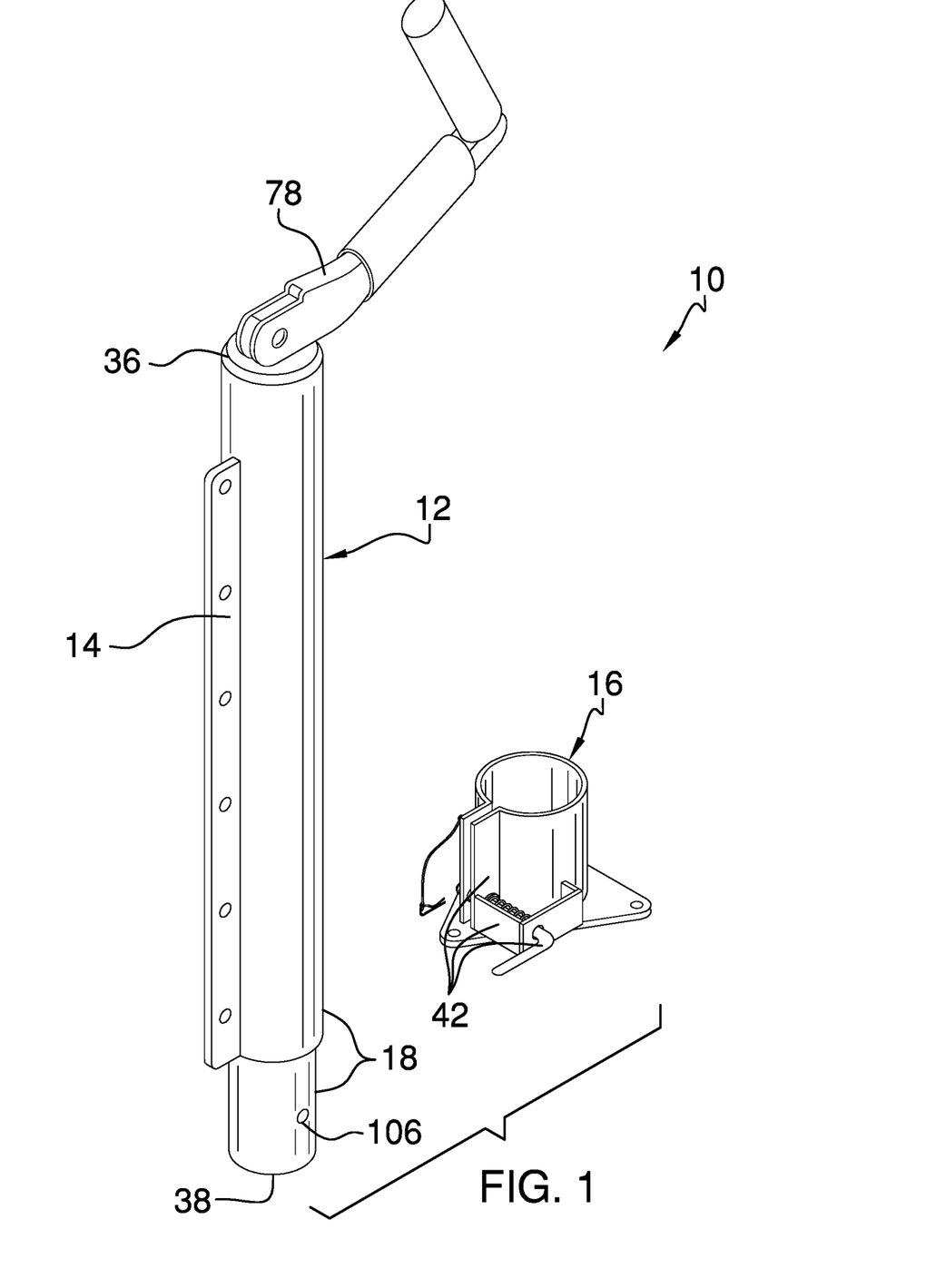
FIG. 1 is an isometric perspective view of a low-profile trailer jack according to an embodiment of the disclosure.
Figure 2:
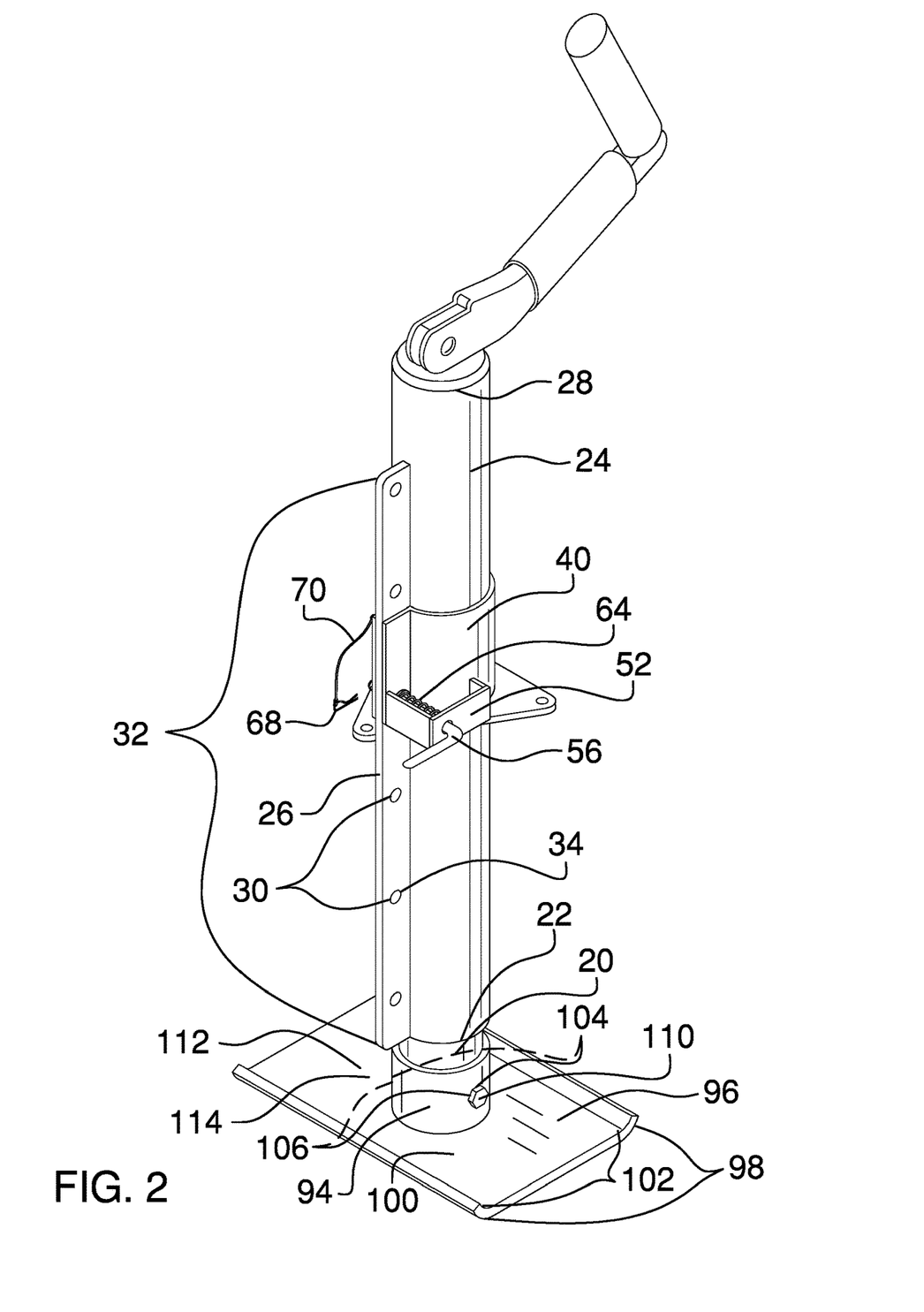
FIG. 2 is an isometric perspective view of an embodiment of the disclosure.
Figure 3:
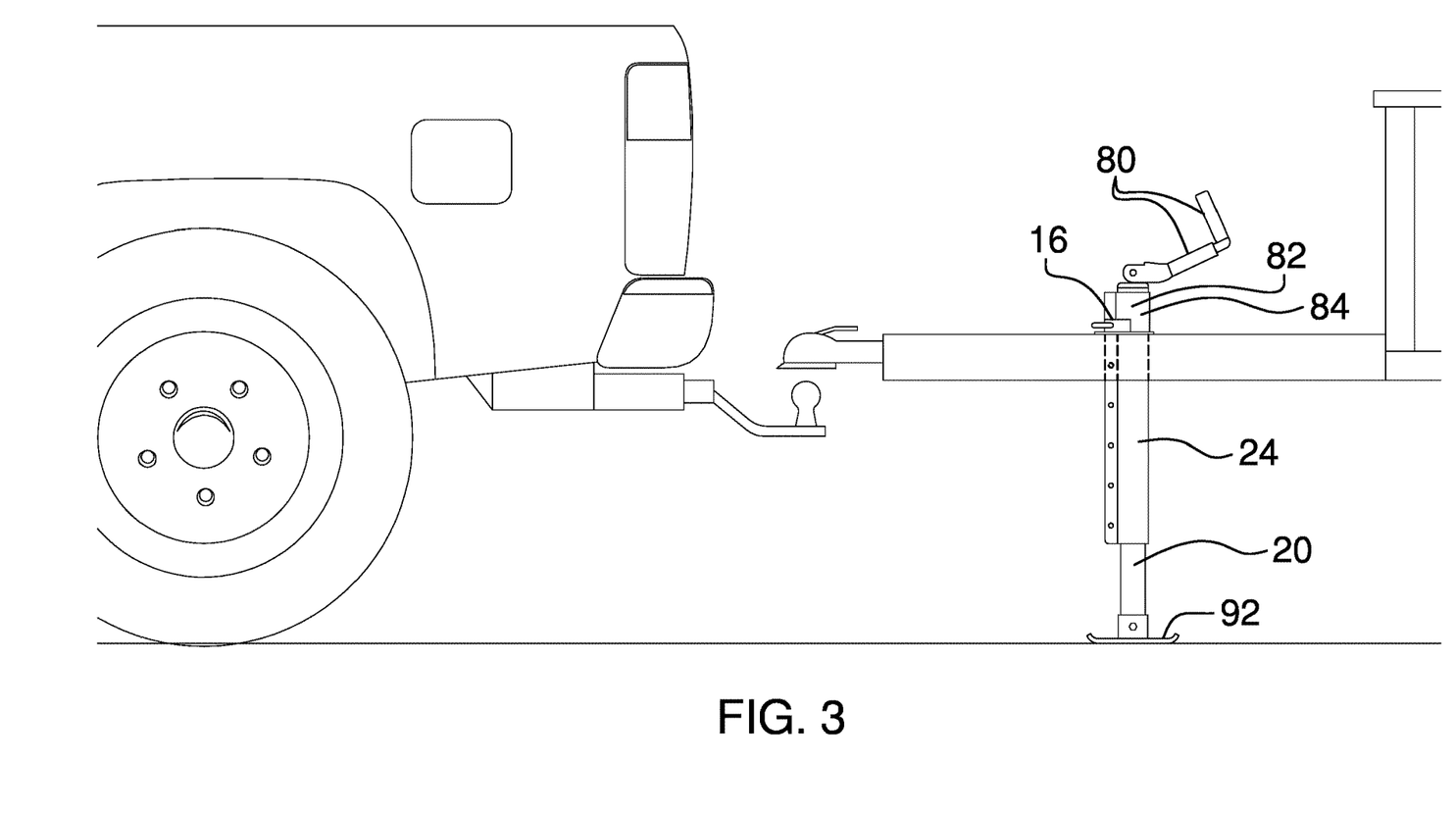
FIG. 3 is an in-use view of an embodiment of the disclosure.
Figure 4:
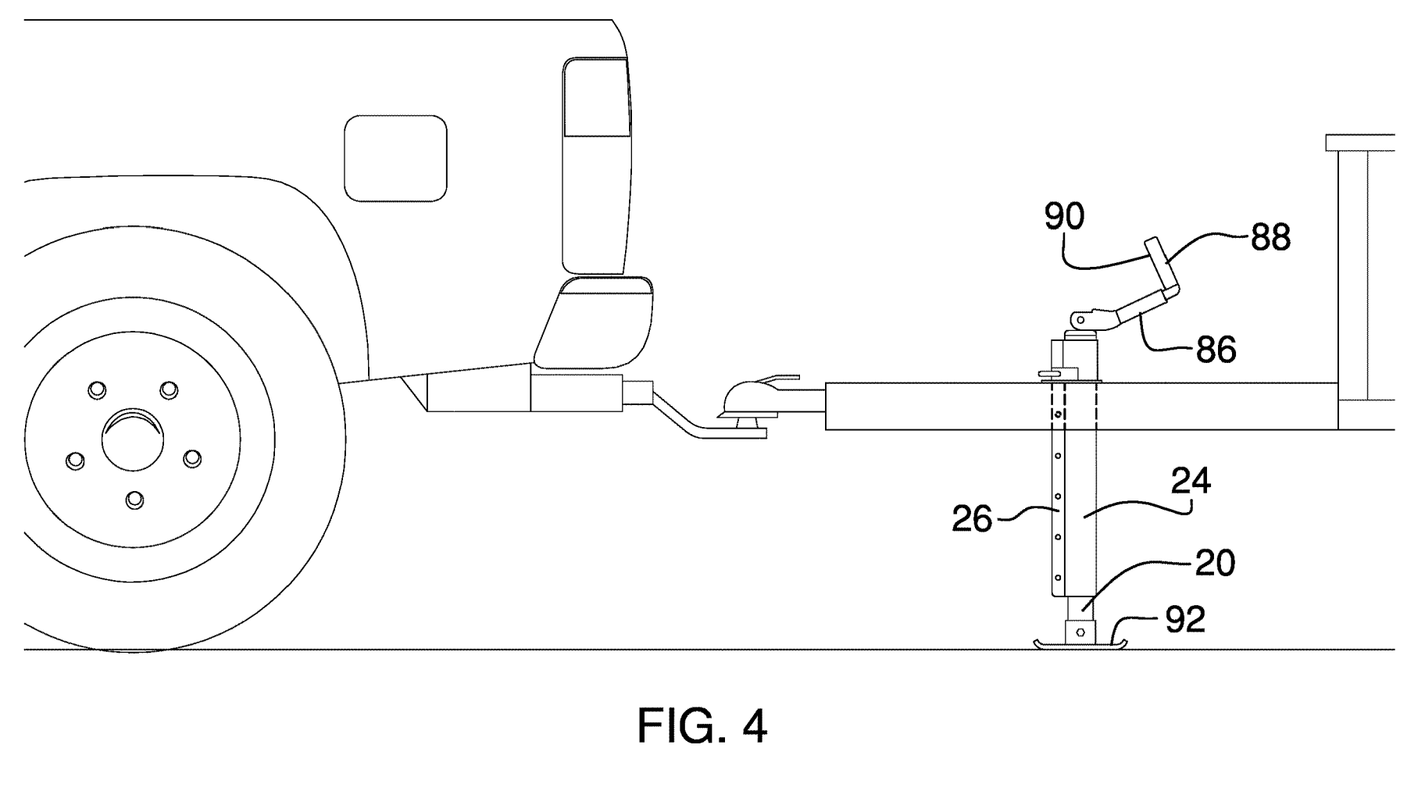
FIG. 4 is an in-use view of an embodiment of the disclosure.

As best illustrated in FIGS. 1 through 6, the low-profile trailer jack 10 generally comprises a jack module 12, a first coupler 14, and a second coupler 16. The jack module 12 comprises a plurality of nested sections 18 so that the jack module 12 is selectively extensible, as shown in FIGS. 3 and 4. The plurality of nested sections 18 comprises an inner pipe 20 that is selectively extensible from a lower end 22 of an outer pipe 24.

The first coupler 14 is coupled to the jack module 12. The first coupler 14 comprises a bar 26 that is coupled to and extends radially from the outer pipe 24. The bar 26 extends from proximate to the lower end 22 to proximate to an upper end 28 of the outer pipe 24. A plurality of first fasteners 30 is coupled to the bar 26. The first fasteners 30 are substantially evenly spaced between opposing ends 32 of the bar 26. Each first fastener 30 comprises a bar hole 34, as shown in FIG. 2.

Figure 6:
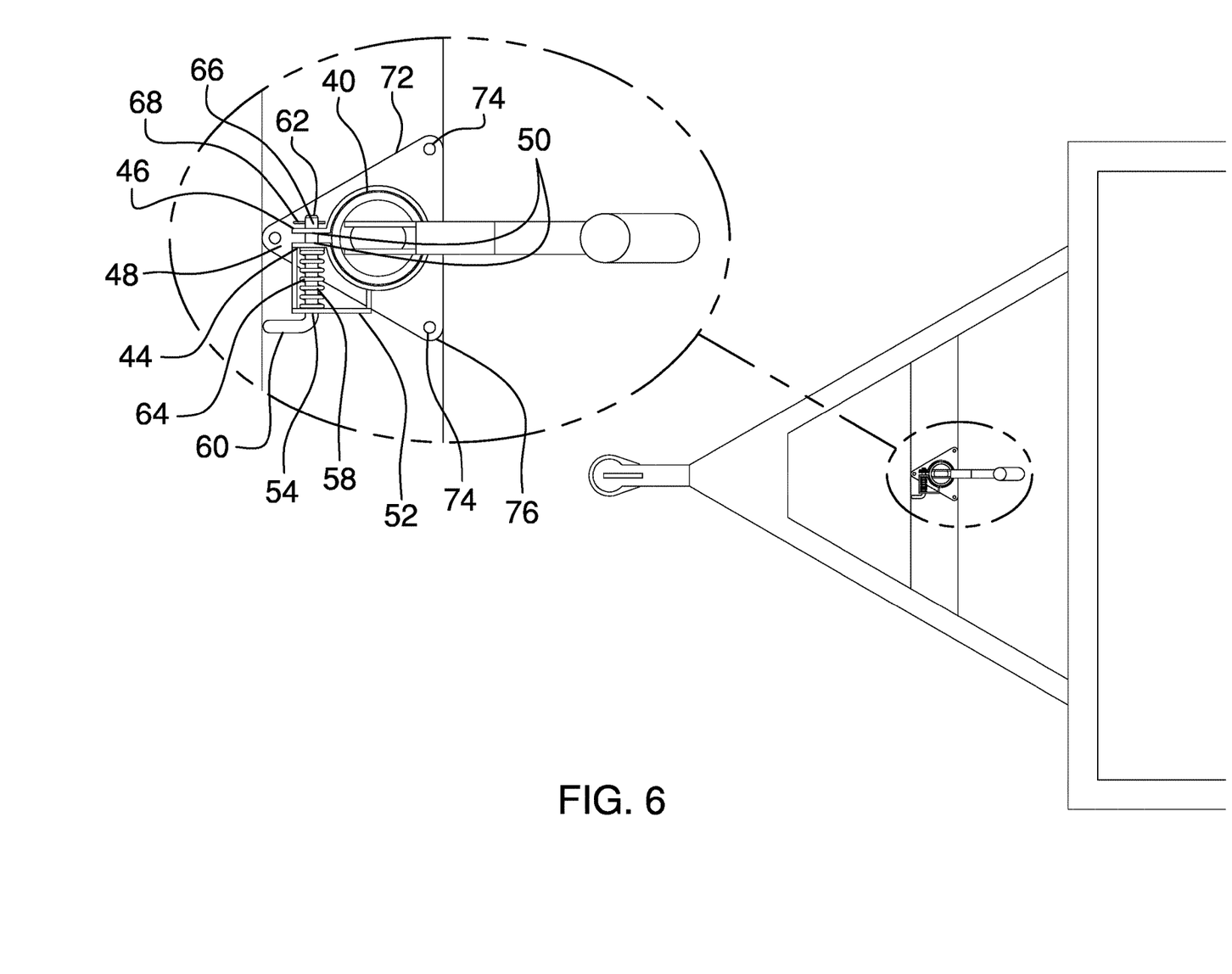
FIG. 6 is a top view of an embodiment of the disclosure.

The second coupler 16 is coupled to an upper face of a hitch assembly proximate to an orifice that is positioned through the hitch assembly, as shown in FIG. 6. The second coupler 16 is complementary to the first coupler 14. The jack module 12 is configured to be selectively inserted into the orifice, positioning the second coupler 16 to selectively couple to the first coupler 14 to fixedly position the jack module 12 within the orifice with a top 36 of the jack module 12 positioned proximate to the second coupler 16. In this configuration, that jack module 12 is configured to elevate the hitch assembly.

Figure 5:
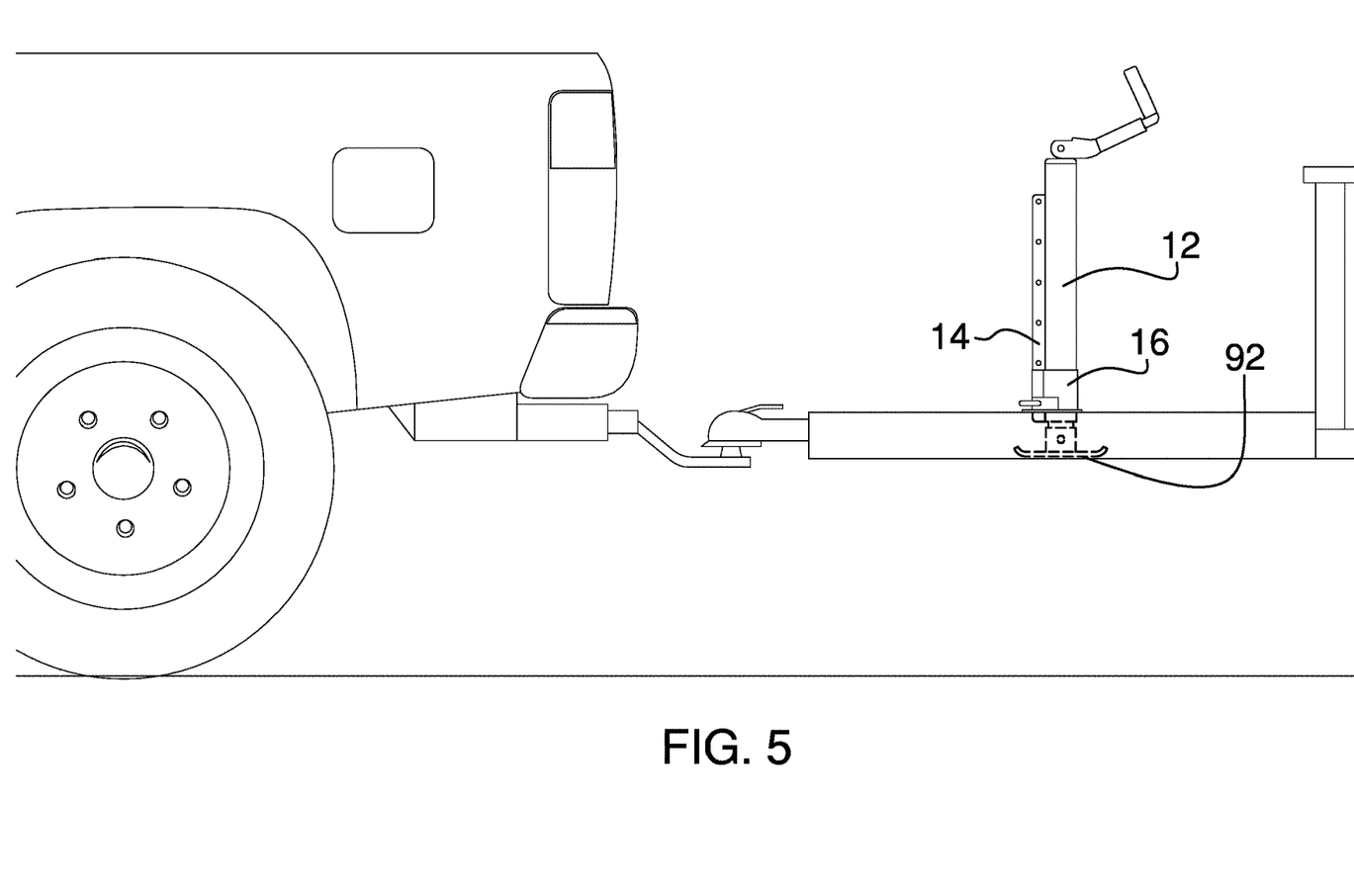
FIG. 5 is an in-use view of an embodiment of the disclosure.

Upon coupling of the hitch assembly to a towing vehicle, the second coupler 16 is also positioned to couple to the jack module 12 so that a bottom 38 of the jack module 12 is positioned proximate to the hitch assembly, with the jack module 12 extending substantially perpendicularly from the upper face of the hitch assembly, as shown in FIG. 5. This configuration prevents damage to the jack module 12 during towing, such as from contacting the road surface in low clearance drainage areas and railroad crossings.

The second coupler 16 comprises a tube 40 that is coupled to and extends perpendicularly from the upper face of the hitch assembly. The tube 40 extends from a circumference of the orifice. A second fastener 42 is coupled to the tube 40. The second fastener 42 is complementary to the first fasteners 30. The second fastener 42 is positioned to selectively couple to a respective first fastener 30 to fixedly position the outer pipe 24 within the orifice.

The second fastener 42 comprises a first slat 44 and a second slat 46 that are coupled to and extend from the tube 40 to define a slot 48. A pair of first pin holes 50 is positioned singly through the first slat 44 and the second slat 46.

A bracket 52 is coupled to and extends between the tube 40 and the first slat 44. The bracket 52 is L-shaped. A second pin hole 54 positioned through the bracket 52 so that the second pin hole 54 is aligned with the pair of first pin holes 50.

The second fastener 42 also comprises a fastening pin 56. The fastening pin 56 comprises a first section 58 and a second section 60. The first section 58 is positioned through second pin hole 54, the slot 48, and the pair of first pin holes 50 so that a first endpoint 62 of the fastening pin 56 protrudes from the second slat 46, as shown in FIG. 6. The second section 60 extends transversely from the first section 58 distal from the first endpoint 62 so that the second section 60 is positioned externally to the bracket 52. The second section 60 is configured to be grasped in digits of a hand of a user to extract the first section 58 from the slot 48.

A spring 64 is positioned around the first section 58 of the fastening pin 56. The spring 64 is positioned between the first slat 44 and the bracket 52. The spring 64 is coupled to the fastening pin 56 proximate to the first slat 44. The spring 64 is configured to be tensioned as the fastening pin 56 is extracted from the slot 48, positioning the bar 26 to slide within the slot 48. The spring 64 is configured to rebound to urge the fastening pin 56 to selectively insert into a respective bar hole 34 to fixedly position the outer pipe 24 within the orifice, as shown in FIGS. 4 and 5.

A third pin hole 66 is positioned through the fastening pin 56 proximate to the first endpoint 62, as shown in FIG. 6. A cotter pin 68 is selectively positionable through the third pin hole 66 to retain the fastening pin 56 within the slot 48. A line 70 is coupled to and extends between the cotter pin 68 and the second slat 46. The line 70 is positioned to retain the cotter pin 68 in proximity to the second coupler 16.

A mounting plate 72 is coupled to and positioned between the second coupler 16 and the upper face of the hinge assembly. The mounting plate 72 extends radially from the second coupler 16. The mounting plate 72 is configured to stabilize the second coupler 16 relative to the hinge assembly. The mounting plate 72 is triangularly shaped.

A plurality of plate holes 74 is positioned through the mounting plate 72, as shown in FIG. 6. Each plate hole 74 is configured to insert a respective article of mounting hardware to selectively couple the mounting plate 72 and the second coupler 16 to the hinge assembly. This configuration would be utilized when the second coupler 16 is a postmarket addition to the hinge assembly. The plurality of plate holes 74 comprises plate holes 74 that are positioned singly proximate to each corner 76 of the mounting plate 72.

An actuator 78 is operationally coupled to the jack module 12. The actuator 78 is positioned to selectively extend the nested sections 18 so that the bottom 38 of the jack module 12 contacts a surface to elevate the hitch assembly relative to the surface.

The actuator 78 comprises a handle 80 that is rotationally coupled to the top 36 of the jack module 12. The handle 80 is operationally coupled to a drive gear 82 of a gear assembly 84, or the like. The gear assembly 84 is coupled to and positioned in the outer pipe 24. The gear assembly 84 is operationally coupled to the inner pipe 20. The handle 80 is configured to be grasped in the hand of the user to rotate the handle 80 concurrently with the drive gear 82 to selectively extend the inner pipe 20 from the outer pipe 24.

The handle 80 comprises a first rod 86 that is pivotally coupled to and extends from the top 36 of the jack module 12. A second rod 88 is coupled to and extends substantially perpendicularly from the first rod 86 distal from the jack module 12. The second rod 88 is configured to be grasped in the hand of the user to rotate the first rod 86 concurrently with the drive gear 82 to selectively extend the inner pipe 20 from the outer pipe 24.

A sleeve 90 is positioned over the second rod 88 so that the second rod 88 is rotatable within the sleeve 90. The sleeve 90 is configured to allow rotation of the second rod 88 within the sleeve 90 to facilitate rotation of the first rod 86 relative to the jack module 12.

A base 92 is coupled to the bottom 38 of the jack module 12, as shown in FIG. 2. The base 92 is configured to stabilize the jack module 12 on the surface and to prevent penetration of the bottom 38 of the jack module 12 into the surface.

The base 92 comprises a base pipe 94 that is coupled to and extends perpendicularly from a jack plate 96. The base pipe 94 is circumferentially larger than the inner pipe 20. The base pipe 94 is positioned to selectively insert the inner pipe 20. The jack plate 96 comprises a pair of edge pieces 98 and a midsection 100. Each edge piece 98 is coupled to an extends arcuately from a respective opposing side 102 of the midsection 100.

A pair of base pipe holes 104 is positioned through the base pipe 94. A pair of inner pipe holes 106 is positioned through the inner pipe 20. The inner pipe holes 106 are positioned to selectively align with the base pipe holes 104. A bolt 108 is selectively positionable through the base pipe holes 104 and the inner pipe holes 106 so that a head 110 of the bolt 108 abuts the base pipe 94 and a threaded section 112 of the bolt 108 protrudes from the base pipe 94. A nut 114 that is complementary to the threaded section 112 of the bolt 108 is positioned to threadedly insert the threaded section 112 of the bolt 108 to removably couple the base 92 to the inner pipe 20. The ability to decouple the base 92 from the jack module 12 allows the user to remove the base 92 to slide the jack module 12 free of the hitch assembly.

In use, the jack module 12 is lowered through the orifice in the hitch assembly so that the jack module 12 protrudes from the hitch assembly toward the surface. The second coupler 16 is coupled to the first coupler 14 to fixedly position the jack module 12 with the top 36 of the jack module 12 positioned proximate to the second coupler 16. The actuator 78 is engaged to urge the inner pipe 20 from the outer pipe 24, wherein the base 92 contacts the surface and elevates the hitch assembly. Upon coupling of the hitch assembly to the towing vehicle, the second coupler 16 is positioned to couple to the jack module 12 so that the bottom 38 of the jack module 12 is positioned proximate to the hitch assembly, with the jack module 12 extending substantially perpendicularly from the upper face of the hitch assembly.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A low-profile trailer jack comprising:
a jack module comprising a plurality of nested sections such that the jack module is selectively extensible, the plurality of nested sections comprising an inner pipe selectively extensible from a lower end of an outer pipe;
a first coupler coupled to the jack module;
a second coupler coupled to an upper face of a hitch assembly proximate to an orifice positioned through the hitch assembly, the second coupler being complementary to the first coupler wherein the jack module is configured for selectively inserting into the orifice positioning the second coupler for selectively coupling to the first coupler for fixedly positioning the jack module within the orifice with a top of the jack module positioned proximate to the second coupler; and
an actuator operationally coupled to the jack module wherein the actuator is positioned for selectively extending the nested sections such that a bottom of the jack module contacts a surface for elevating the hitch assembly relative to the surface;
the first coupler comprising
a bar coupled to and extending radially from the outer pipe, the bar
extending from proximate to the lower end to proximate to an upper end of the outer pipe, and
a plurality of first fasteners coupled to the bar and substantially evenly spaced between opposing ends of the bar;
the second coupler comprising
a tube coupled to and extending perpendicularly from the upper face of the hitch assembly, the tube extending from a circumference of the orifice, and
a second fastener coupled to the tube, the second fastener being complementary to the first fasteners wherein the second fastener is positioned for selectively coupling to a respective first fastener for fixedly positioning the outer pipe within the orifice;
each first fastener comprising a bar hole; and
the second fastener comprising
a first slat and a second slat coupled to and extending from the tube defining a slot,
a pair of first pin holes positioned singly through the first slat and the second slat,
a bracket coupled to and extending between the tube and the first slat, the bracket being L-shaped,
a second pin hole positioned through the bracket such that the second pin hole is aligned with the pair of first pin holes,
a fastening pin comprising a first section and a second section, the first section being positioned through second pin hole, the slot, and the pair of first pin holes such that a first endpoint of the fastening pin protrudes from the second slat, the second section extending transversely from the first section distal from the first endpoint such that the second section is positioned externally to the bracket and configured for grasping in digits of a hand of a user for extracting the first section from the slot, and
a spring positioned around the first section of the fastening pin, the spring being positioned between the first slat and the bracket, the spring being coupled to the fastening pin proximate to the first slat wherein the spring is configured for tensioning as the fastening pin is extracted from the slot positioning the bar for sliding within the slot, wherein the spring is configured for rebounding for urging the fastening pin for selectively inserting into a respective bar hole for fixedly positioning the outer pipe within the orifice.

2. The jack of claim 1, further comprising:
a third pin hole positioned through the fastening pin proximate to the first endpoint; and
a cotter pin selectively positionable through the third pin hole for retaining the fastening pin within the slot.

3. The jack of claim 2, further including a line coupled to and extending between the cotter pin and the second slat wherein the line is positioned for retaining the cotter pin in proximity to the second coupler.

4. The jack of claim 1, further including a mounting plate coupled to and positioned between the second coupler and the upper face of the hinge assembly, the mounting plate extending radially from the second coupler wherein the mounting plate is configured for stabilizing the second coupler relative to the hinge assembly.

5. The jack of claim 4, further including the mounting plate being triangularly shaped.

6. The jack of claim 4, further including a plurality of plate holes positioned through the mounting plate wherein each plate hole is configured for inserting a respective article of mounting hardware for selectively coupling the mounting plate and the second coupler to the hinge assembly.

7. The jack of claim 6, further including the plurality of plate holes comprising plate holes positioned singly proximate to each corner of the mounting plate.

8. The jack of claim 1, further including the actuator comprising a handle rotationally coupled to the top of the jack module, the handle being operationally coupled to a drive gear of a gear assembly, the gear assembly being coupled to and positioned in the outer pipe, the gear assembly being operationally coupled to the inner pipe wherein the handle is configured for grasping in the hand of the user for rotating the handle concurrently with the drive gear for selectively extending the inner pipe from the outer pipe.

9. The jack of claim 8, further including the handle comprising:
a first rod pivotally coupled to and extending from the top of the jack module; and
a second rod coupled to and extending substantially perpendicularly from the first rod distal from the jack module wherein the second rod is configured for grasping in the hand of the user for rotating the first rod concurrently with the drive gear for selectively extending the inner pipe from the outer pipe.

10. The jack of claim 9, further including a sleeve positioned over the second rod such that the second rod is rotatable within the sleeve wherein the sleeve is configured for allowing rotation of the second rod within the sleeve for facilitating rotation of the first rod relative to the jack module.

11. The jack of claim 1, further including a base coupled to the bottom of the jack module wherein the base is configured for stabilizing the jack module on the surface and for preventing penetration of the bottom of the jack module into the surface.

12. The jack of claim 11, further including the base comprising:
 a base pipe coupled to and extending perpendicularly from a jack plate, the base pipe being circumferentially larger than the inner pipe wherein the base pipe is positioned for selectively inserting the inner pipe;
 a pair of base pipe holes positioned through the base pipe;
 a pair of inner pipe holes positioned through the inner pipe wherein the inner pipe holes are positioned for selectively aligning with the base pipe holes;
 a bolt selectively positionable through the base pipe holes and the inner pipe holes such that a head of the bolt abuts the base pipe and a threaded section of the bolt protrudes from the base pipe; and
 a nut complementary to the threaded section of the bolt wherein the nut is positioned for threadedly inserting the threaded section of the bolt for removably coupling the base to the inner pipe.

13. The jack of claim 12, further including the jack plate comprising a pair of edge pieces and a midsection, each the edge piece being coupled to an extending arcuately from a respective opposing side of the midsection.

14. A low-profile trailer jack comprising:
 a jack module comprising a plurality of nested sections such that the jack module is selectively extensible, the plurality of nested sections comprising an inner pipe selectively extensible from a lower end of an outer pipe;
 a first coupler coupled to the jack module, the first coupler comprising:
  a bar coupled to and extending radially from the outer pipe, the bar extending from proximate to the lower end to proximate to an upper end of the outer pipe, and
  a plurality of first fasteners coupled to the bar and substantially evenly spaced between opposing ends of the bar, each first fastener comprising a bar hole;
 a second coupler coupled to an upper face of a hitch assembly proximate to an orifice positioned through the hitch assembly, the second coupler being complementary to the first coupler wherein the jack module is configured for selectively inserting into the orifice positioning the second coupler for selectively coupling to the first coupler for fixedly positioning the jack module within the orifice with a top of the jack module positioned proximate to the second coupler, the second coupler comprising:
  a tube coupled to and extending perpendicularly from the upper face of the hitch assembly, the tube extending from a circumference of the orifice,
  a second fastener coupled to the tube, the second fastener being complementary to the first fasteners wherein the second fastener is positioned for selectively coupling to a respective first fastener for fixedly positioning the outer pipe within the orifice, the second fastener comprising:
   a first slat and a second slat coupled to and extending from the tube defining a slot,
   a pair of first pin holes positioned singly through the first slat and the second slat,
   a bracket coupled to and extending between the tube and the first slat, the bracket being L-shaped,
   a second pin hole positioned through the bracket such that the second pin hole is aligned with the pair of first pin holes,
   a fastening pin comprising a first section and a second section, the first section being positioned through second pin hole, the slot, and the pair of first pin holes such that a first endpoint of the fastening pin protrudes from the second slat, the second section extending transversely from the first section distal from the first endpoint such that the second section is positioned externally to the bracket and configured for grasping in digits of a hand of a user for extracting the first section from the slot,
   a spring positioned around the first section of the fastening pin, the spring being positioned between the first slat and the bracket, the spring being coupled to the fastening pin proximate to the first slat wherein the spring is configured for tensioning as the fastening pin is extracted from the slot positioning the bar for sliding within the slot, wherein the spring is configured for rebounding for urging the fastening pin for selectively inserting into a respective bar hole for fixedly positioning the outer pipe within the orifice,
   a third pin hole positioned through the fastening pin proximate to the first endpoint,
   a cotter pin selectively positionable through the third pin hole for retaining the fastening pin within the slot, and
   a line coupled to and extending between the cotter pin and the second slat wherein the line is positioned for retaining the cotter pin in proximity to the second coupler;
 a mounting plate coupled to and positioned between the second coupler and the upper face of the hinge assembly, the mounting plate extending radially from the second coupler wherein the mounting plate is configured for stabilizing the second coupler relative to the hinge assembly, the mounting plate being triangularly shaped;
 a plurality of plate holes positioned through the mounting plate wherein each plate hole is configured for inserting a respective article of mounting hardware for selectively coupling the mounting plate and the second coupler to the hinge assembly, the plurality of plate holes comprising plate holes positioned singly proximate to each corner of the mounting plate;
 an actuator operationally coupled to the jack module wherein the actuator is positioned for selectively extending the nested sections such that a bottom of the jack module contacts a surface for elevating the hitch assembly relative to the surface, the actuator comprising a handle rotationally coupled to the top of the jack module, the handle being operationally coupled to a drive gear of a gear assembly, the gear assembly being coupled to and positioned in the outer pipe, the gear assembly being operationally coupled to the inner pipe wherein the handle is configured for grasping in the hand of the user for rotating the handle concurrently with the drive gear for selectively extending the inner pipe from the outer pipe, the handle comprising:
- a first rod pivotally coupled to and extending from the top of the jack module,
- a second rod coupled to and extending substantially perpendicularly from the first rod distal from the jack module wherein the second rod is configured for grasping in the hand of the user for rotating the first rod concurrently with the drive gear for selectively extending the inner pipe from the outer pipe, and
- a sleeve positioned over the second rod such that the second rod is rotatable within the sleeve wherein the sleeve is configured for allowing rotation of the second rod within the sleeve for facilitating rotation of the first rod relative to the jack module; and a base coupled to the bottom of the jack module wherein the base is configured for stabilizing the jack module on the surface and for preventing penetration of the bottom of the jack module into the surface, the base comprising:

- a base pipe coupled to and extending perpendicularly from a jack plate, the base pipe being circumferentially larger than the inner pipe wherein the base pipe is positioned for selectively inserting the inner pipe, the jack plate comprising a pair of edge pieces and a midsection, each the edge piece being coupled to an extending arcuately from a respective opposing side of the midsection,
- a pair of base pipe holes positioned through the base pipe,
- a pair of inner pipe holes positioned through the inner pipe wherein the inner pipe holes are positioned for selectively aligning with the base pipe holes,
- a bolt selectively positionable through the base pipe holes and the inner pipe holes such that a head of the bolt abuts the base pipe and a threaded section of the bolt protrudes from the base pipe, and
- a nut complementary to the threaded section of the bolt wherein the nut is positioned for threadedly inserting the threaded section of the bolt for removably coupling the base to the inner pipe.

\* \* \* \* \*